United States Patent
Saito et al.

[11] Patent Number: 5,930,570
[45] Date of Patent: Jul. 27, 1999

[54] ORIENTED FOAMED ROTARY MEMBER, AND DEVELOPING DEVICE USING SAME

[75] Inventors: Yoshiro Saito; Hiroshi Sasame, both of Yokohama; Tatsuhiko Hayakawa, Tokyo; Tetsuya Kobayashi, Kawasaki; Naoki Enomoto, Yokohama; Tomoyuki Ohkura; Hideo Kimata, both of Okazaki, all of Japan

[73] Assignee: Canon Kabushiki Kaisha, Tokyo, Japan

[21] Appl. No.: 08/658,585

[22] Filed: Jun. 5, 1996

[30] Foreign Application Priority Data

Jun. 7, 1995 [JP] Japan ................................... 7-164721
Jun. 7, 1995 [JP] Japan ................................... 7-164722

[51] Int. Cl.$^6$ ........................... G03G 15/08; B29B 07/10
[52] U.S. Cl. ........................... 399/279; 399/272; 399/281; 492/30
[58] Field of Search ................................... 399/272, 274, 399/281, 284, 265, 279; 492/30, 56, 57

[56] References Cited

U.S. PATENT DOCUMENTS

| | | | |
|---|---|---|---|
| 5,086,728 | 2/1992 | Kinoshita | 399/281 |
| 5,202,729 | 4/1993 | Miyamoto et al. | 355/251 |
| 5,235,386 | 8/1993 | Yano et al. | 355/219 |
| 5,287,150 | 2/1994 | Kinoshita | 399/281 |
| 5,599,266 | 2/1997 | Landl et al. | 492/56 |

FOREIGN PATENT DOCUMENTS

| | | |
|---|---|---|
| 05061350 | 3/1993 | Japan . |
| 05119618 | 5/1993 | Japan . |

OTHER PUBLICATIONS

Patent abstract of Japan, vol. 017, no. 485 (p–1605), Sep. 2 1993.
Patent abstract of Japan, vol. 017, no. 372 (p–1573), Jul. 13 1993.

Primary Examiner—Arthur T. Grimley
Assistant Examiner—Quana Guainger
Attorney, Agent, or Firm—Fitzpatrick, Cella, Harper & Scinto

[57] ABSTRACT

There are disclosed a foamed rotary member having a surface of a foam, and a large number of cells provided in the foam and each having a prolate spheroid shape, wherein the major axis direction of the cell is along the rotation axis direction, and also a developing device using the foamed rotary member as a toner supplying rotary member.

14 Claims, 6 Drawing Sheets

PITCH WHEN SUPPLYING ROLLER ROTATES A HALF OF REVOLUTION

A PORTION WHERE TONER SUPPLYING ABILITY OF SUPPLYING ROLLER IS HIGH

A PORTION WHERE TONER SUPPLYING ABILITY OF SUPPLYING ROLLER IS LOW

FIG. 10

ORIENTED FOAMED ROTARY MEMBER, AND DEVELOPING DEVICE USING SAME

BACKGROUND OF THE INVENTION

1. Field of the Invention

The present invention relates to a foamed rotary member which is used as a paint roller, a paper feed roller, a cleaning roller, or the like, and a method of manufacturing the same and, more particularly, to a toner supply rotary member and a developing device using the same.

2. Related Background Art

Various polyurethane foamed rollers that use a polyurethane soft slab foam used in industrial materials, industrial products, and the like are manufactured in such a manner that a prism member having required dimensions is cut out from a soft slab foam block (foamed raw foam) by various cut-out processing methods, and the prism member is subjected to a cylindrical process such as surface polishing so as to have a roller shape.

The polyurethane soft slab foam block is manufactured by open foaming on a foaming conveyor, and cells in the foam structure have shapes approximate to that of an elliptic member vertically extending along the foaming direction.

The manufacturing method of the foam block will be explained below with reference to FIGS. 4A to 4D.

Figure 4A:
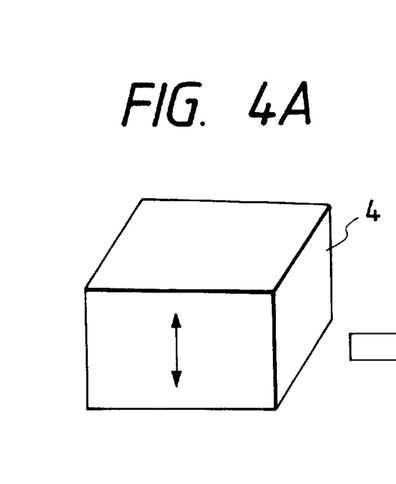
FIGS. 4A to 4D are perspective views showing the steps in the method of manufacturing the foamed roller shown in FIGS. 2A to 2C.

FIG. 4A shows a foamed raw foam which is elongated in the direction of an arrow in FIG. 4A by foaming urethane in a mold having a length corresponding to the roller length that requires a predetermined depth.

Figure 4B:
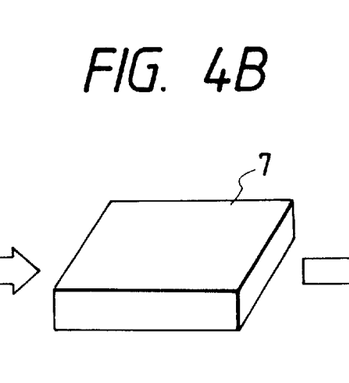
Figure 4C:
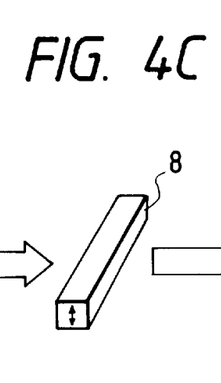
Figure 4D:
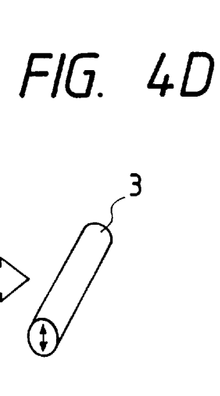

A soft slab foam block 4 as the foamed raw foam shown in FIG. 4A is cut in a direction perpendicular to the foaming direction indicated by the arrow in FIG. 4A to have an appropriate thickness corresponding to the required diameter of the roller (the cutting process in the direction perpendicular to the foaming direction is generally called "a traverse process") to obtain a planar member 7 extending in the direction perpendicular to the foaming direction, as shown in FIG. 4B. The obtained planar member 7 is cut in the foaming direction (the cutting process in the foaming direction is generally called "a longitudinal process") to obtain a prism member 8 in the direction perpendicular to the foaming direction, as shown in FIG. 4C. The prism member 8 is cut to have a required length if necessary. Thereafter, the prism member 8 is subjected to a cylindrical process by means of a polishing process using a grinder or a cutting process using a heating metal wire such as a nichrome wire or the like, and is then hollowed out to a predetermined shape by inserting a rotating cylindrical blade, as needed, thus manufacturing a roller 3 having a required diameter, as shown in FIG. 4D.

As the cut-out processing method of the prism member 8 from the planar member 7, a method of cutting a foam block using a heated nichrome wire, a method of punching out a foam block using a press machine attached with a mold formed by a Thomson blade, and the like are available.

When urethane is foamed in the mold, each cell has a prolate spheroid shape which is long in the foaming direction.

The urethane foamed roller 3 obtained by the manufacturing method shown in FIGS. 4A to 4D has a roller axis direction according with the direction perpendicular to the foaming direction since the slab form block 4 is traverse-processed and is then longitudinal-processed to obtain the prism member 8, and the prism member 8 is processed to have a cylindrical shape. For this reason, each cell in the foam is formed into an elliptic shape extending in the direction perpendicular to the roller axis direction.

Figure 2A:
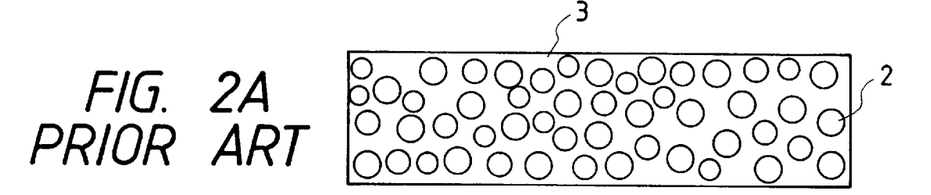
FIGS. 2A to 2C are plan views showing the surface state of a conventional foamed roller.
Figure 2B:
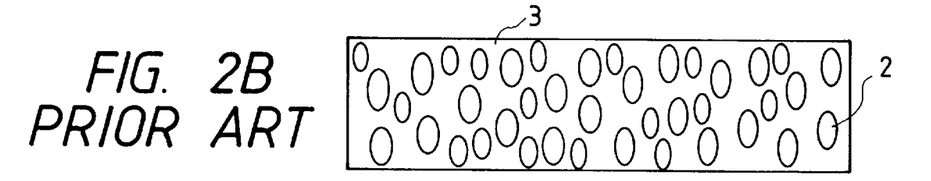
Figure 2C:
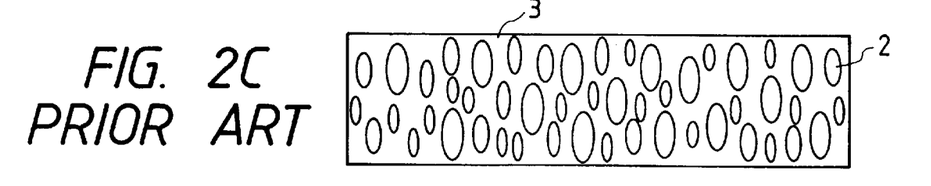

Therefore, the sections (ellipses), in the major axis direction, of elliptic cells 2 appear at a given position on the outer circumferential surface of the urethane formed roller 3, as shown in FIG. 2C, and the sections (circles), in the minor axis direction, of elliptic cells 2 appear at a position rotated through 90° from the former position in the circumferential direction, as shown in FIG. 2A. At a position between these positions, cells 2 have slightly different sectional shapes and sizes since their sectional shapes are changing from an ellipse to a circle or vice versa, as shown in FIG. 2B.

For this reason, the recess portions on the surface of the roller 3 have uneven shapes and volumes. As a result, not only the hardness but also the holding ability of, e.g, a paint of the roller 3 change in the circumferential direction of the surface of the roller 3.

In the conventional urethane foamed roller 3, not only the surface but also the interior are uneven in the circumferential direction, and the physical properties such as the hardness, modulus of elasticity, and the like are not constant in the circumferential direction.

For this reason, the surface of the roller is not easy to polish. In addition, when the roller is used as a paper feed roller or cleaning roller, the roller may locally slip or cause a cleaning error in the circumferential direction.

Figure 5:
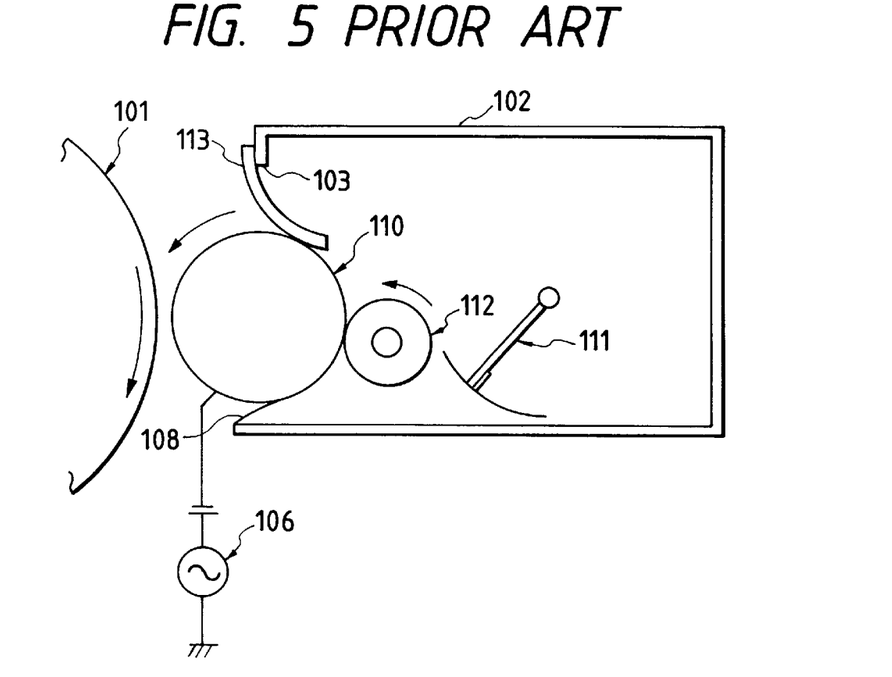
FIG. 5 is a sectional view of a conventional developing device.

FIG. 5 shows a developing device using a toner supplying roller.

The developing device comprises a developing chamber 102, which has an opening portion 103 opposing a photosensitive drum 101 serving as an electrostatic latent image carrier, and stores toner. A developing sleeve 110 is arranged in the developing chamber 102, and serves as a toner carrier, which carries the toner and conveys the toner to the photosensitive drum 101.

The developing sleeve 110 is arranged in the developing chamber 102 so that a portion of its outer circumferential surface externally protrudes from the opening portion 103. The developing sleeve 110 is held to be separated from the photosensitive drum 101 by a gap of 50 to 500 $\mu$m, and is formed with a developing area to supply the toner carried on the developing sleeve 110 toward the photosensitive drum 110. Also, a toner supplying roller 112 for supplying the toner conveyed by a convey means 111 to the developing sleeve 110 is arranged in the developing chamber 102.

The developing sleeve 110 is applied with a developing bias obtained by superposing an AC voltage on a DC voltage. The developing bias is generated by a bias power supply 106.

A blade 113 for regulating the thickness of a toner layer carried on the developing sleeve 110 is arranged above the developing sleeve 110. The blade 113 is attached to the developing chamber 102. A blow-out prevention sheet 108 for preventing toner from externally blowing out from the lower portion of the developing chamber 102 is arranged below the developing sleeve 110.

Upon development, the convey means 111 conveys toner toward the toner supplying roller 112, and the toner is applied onto the developing sleeve 110 by the toner supplying roller 112. The developing sleeve 110 is rotated in the direction of an arrow in FIG. 5, and the toner carried on the developing sleeve 110 is regulated by the blade 113 to have a predetermined toner layer thickness. Thereafter, the toner is supplied to the above-mentioned developing area. On the developing area, an electric field is formed by the developing bias, and the toner on the developing sleeve 110 flies toward a portion, where a latent image is formed, of the surface of the photosensitive drum 110 due to the presence of the electric field force.

In the above-mentioned developing device, both magnetic and nonmagnetic toners can be used. Since magnet or the like is dispersed in a resin such as stylene, acryl, or the like in magnetic toner, if color toner is formed by magnetic toner, only dull colors with low saturation will be obtained. Therefore, when a color image is formed using monocomponent developing agents, nonmagnetic toner that does not contain any magnetic member is preferably used.

The toner supplying roller 112 and the developing sleeve 110 rotate in the same direction, and the toner supplying roller 112 peels off the residual toner on the developing sleeve 110. If the residual toner is insufficiently peeled off, highly charged toner by triboelectrification remains on the surface of the developing sleeve 110. When the highly charged toner is deposited upon rotation of the developing sleeve 110, it prevents new toner from contacting the developing sleeve 110, and new toner cannot be sufficiently charged.

As a result, both insufficiently charged toner and the charged-up toner are present on the developing sleeve to form a broad charge distribution, thus causing errors such as fogging or low density due to insufficiently charged toner, a blotch (a phenomenon that toner does not attach in a sufficient amount to the developing portion) due to highly charged toner, and the like. Furthermore, a ghost phenomenon is induced, i.e., the previously formed image is again formed for about one revolution of the developing sleeve.

In the case of magnetic toner, a magnetic constraint force can act on the lower charged toner by triboelectrification since the developing sleeve 110 contains a magnet, thus easily preventing fogging. However, in the case of nonmagnetic toner, since most of the forces acting on the toner are almost by electrostatic forces, fogging caused by low charged toner considerably occurs.

Figure 10:
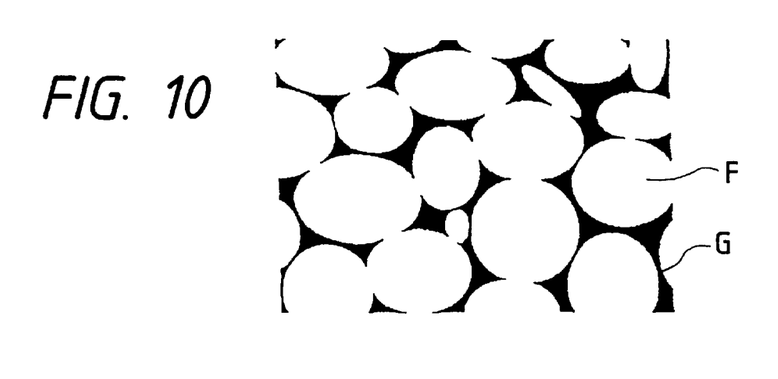
FIG. 10 is a view showing the states of cells of the toner supplying roller.

As an elastic member of, e.g., a sponge constituting the toner supplying roller 112, foamed urethane is often used. In the foamed urethane, the material grows upward as it is foamed, and cavities F and walls G form continuous cells, as shown in FIG. 10.

Figure 6:
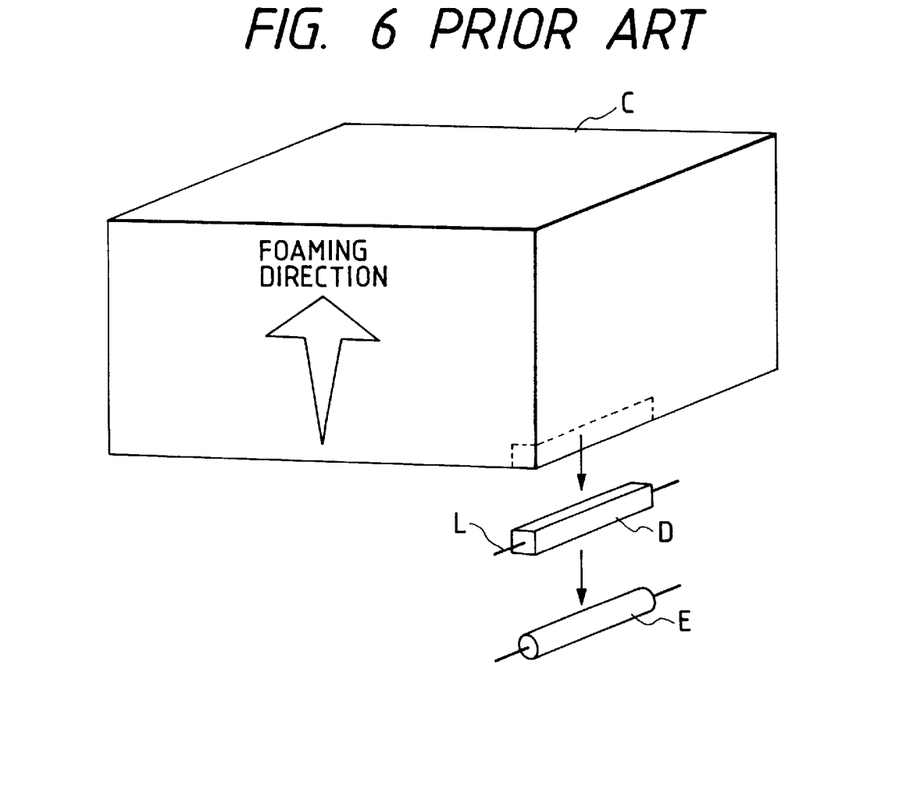
FIG. 6 is a perspective view showing the conventional method of manufacturing a foamed roller.

When the toner supplying roller is formed using such foamed urethane raw foam, as shown in FIG. 6, a raw foam C is divided so that the lateral direction perpendicular to the foaming direction of the raw foam C accords with the longitudinal direction of the roller, similarly to the example shown in FIGS. 4A to 4D. A shaft L is inserted into a divided foamed urethane D, and the surface of the foamed urethane D with the shaft L inserted is processed to complete a roller E, i.e., the toner supplying roller 112. With this process, the toner supplying roller 112 can be formed efficiently without wasting an expensive raw foam.

However, since cells have different shapes in their sections in the longitudinal and lateral directions with respect to the foaming direction, if the lateral direction of the raw foam is the longitudinal direction of the roller, the toner peeling ability and the toner supplying ability of the toner supplying roller 112 change every 90° in the circumferential direction of the roller. As a result, the image density changes or fogging occurs at a half revolution pitch of the toner supplying roller.

In the case of a cartridge type developing device, in order to prevent toner from leaking before use, the developing chamber and a toner storage chamber are partitioned, and the partition is removed when the device is used, so that toner can be supplied first to the toner supplying roller 112. For this reason, the unevenness, in the circumferential direction, of the roller leads to an unevenness in the amount of toner conveyed. The density unevenness tends to continue until toner attaches well to the toner supplying roller, i.e., until toner particles enter the cavities on the surface of the toner supplying roller and the roller surface uniformly carries the toner.

Furthermore, since the contact pressure of the toner supplying roller 112 with respect to the developing sleeve 110 changes depending on the concentration of cells, the driving torque of the developing device varies to cause pitch unevenness on an image. Also, the toner supplying roller is separated from the developing sleeve every half revolution due to a repulsion force and is vibrated, thus causing pitch unevenness. In addition, the toner supplying ability and the peeling ability change, resulting in image unevenness.

In recent image forming apparatuses, since images have higher resolutions, image unevenness such as pitch unevenness is more conspicuous. Especially, in a color image forming apparatus which forms a full-color image by superposing color images a plurality of number of times, the unevenness may appear as a color difference or may be emphasized by color superposition.

SUMMARY OF THE INVENTION

It is an object of the present invention to provide a foamed rotary member which has even surface and inner characteristics in the circumferential direction, and a method of manufacturing the same.

It is another object of the present invention to provide a toner supplying rotary member which can make a toner supplying ability and peeling ability constant in the circumferential direction, and a developing device using the same.

It is still another object of the present invention to provide a foamed rotary member comprising:
 a surface of a foam; and
 a large number of cells provided in the foam and each having a prolate spheroid shape,
 wherein a major axis direction of the cell is along a rotation axis direction.

It is still another object of the present invention to provide a developing device comprising:
 a toner carrier which opposes an electrostatic latent image carrier to form a developing portion; and
 a toner supplying rotary member which contacts the toner carrier, peels toner on the toner carrier, and supplies toner to the toner carrier,
 wherein the toner supplying rotary member has a surface of a foam, each of cells in the foam has a prolate spheroid shape, and a major axis direction of the cell is along a rotation axis direction It is still another object of the present invention to provide a method of manufacturing a foamed roller, comprising the steps of:
 forming a slab foam foamed in a predetermined direction;
 forming a prism by cutting the slab foam in a foaming direction; and
 forming a roller having an axial direction according with the foaming direction from the prism.

Other objects of the present invention will become apparent from the following description.

DESCRIPTION OF THE PREFERRED EMBODIMENTS

Figure 1A:
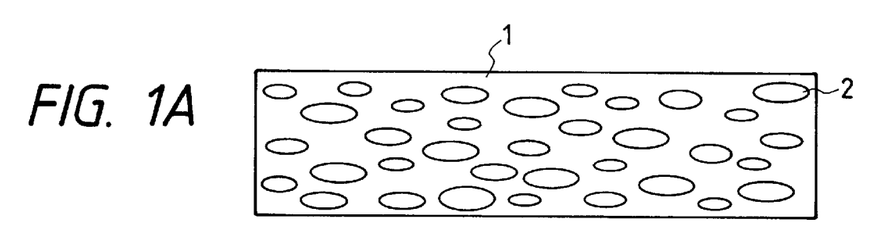
FIGS. 1A and 1B are plan views showing the surface state of a foamed roller according to an embodiment of the present invention.
Figure 1B:
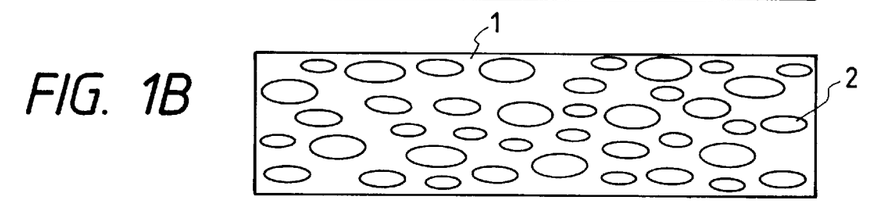

FIGS. 1A and 1B are plan views showing the surface state of a foamed rotary member according to an embodiment of the present invention, and FIGS. 3A to 3D are explanatory views of the method of manufacturing the foamed rotary member shown in FIGS. 1A and 1B.

A foam of this embodiment is polyurethane foam rubber.

The polyurethane foam is a foam manufactured in such a manner that a polyisocyanate and a polyol (polyether or polyester polyol) are allowed to react with each other to simultaneously start a polymer formation reaction and a foaming reaction. A polyurethane soft slab foam used in this embodiment is also roughly classified into polyether and polyester foams, and either of them may be used.

The polyisocyanate is not particularly limited as long as it is one normally used in the manufacture of a polyurethane foam. In the soft slab foam, especially, TDI (toluene diisocyanate) is popularly used. In some cases, a mixture of TDI and MDI (diphenylmethane-4,4'-diisocyanate), modified TDI or MDI, and the like, may be used.

The type of polyol is not particularly limited. For example, polypropylene glycol, polypropylene adipate, polycaprolactone, or the like may be used, or a polyol obtained by graft-polymerizing an ethylene unsaturated compound such as acrylonitrile, stylene, methyl methacrylate, or the like to a polymer polyol, i.e., a polyether polyol may be used. These materials are normally used in the state of an insoluble, highly stable suspension.

Water is mainly used as a foaming agent in the soft slab foam. In this case, dichloromethane may be used together for the purpose of, e.g., suppressing heat generation. As a catalyst, an amine-based catalyst, in particular, tertiary amine, and an organotin compound such as stannous octoate, dibutyltin diacetate, dibutyltin dilaurate, or the like are popularly used in combination. Furthermore, as a foam stabilizer, a block copolymer of dimethyl polysiloxane and polyether is normally used. In a high-elasticity foam or the like, a special foam stabilizer obtained by adding an organofunctional group to polysiloxane may be used. In addition, in the foam source material, a coloring agent, a fire retardant, a filler, and the like may be mixed as needed.

The foamed rotary member of this embodiment can be used as a cleaning roller, a paper feed roller, and the like in electrophotography apparatuses such as an electrophotographic copying machine, an electrophotography machine, various printers, and the like as well as a paint roller for normal painting. Since the foamed rotary member is used in such a broad application, the number of cells which is important for such foamed rotary members widely ranges from 5 to 120 cells per inch. Needless to say, the individual rotary members have different preferred ranges for the number of cells.

For example, as for paint rollers, foams, the number of cells of which widely ranges from 5 to 60 cells per inch, are used depending on more concrete applications or users. In paint rollers for wall painting, which have the largest market, rollers subjected to a skin film removal process and having the number of cells within the range from 6 to 30 cells per inch are popularly used. On the other hand, as various rollers for an electrophotography apparatus, a plurality of rollers with different qualities are often used in a single process. Even rollers for an identical purpose have various functions and specifications, and the range of the number of cells is not constant.

The method of manufacturing a polyurethane foamed roller according to the present invention will be explained below with reference to FIGS. 3A to 3D.

Figure 3A:
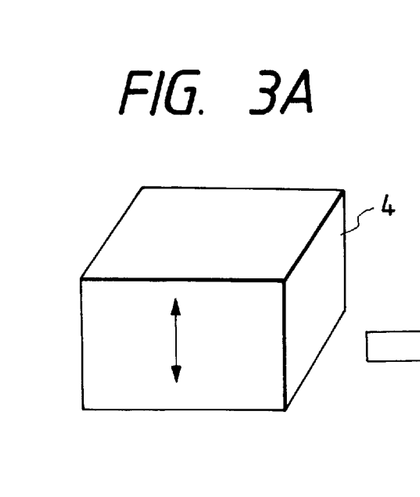
FIGS. 3A to 3D are perspective views showing the steps in the method of manufacturing the foamed roller shown in FIGS. 1A and 1B.
Figure 3B:
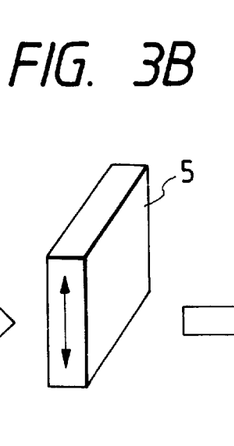
Figure 3C:
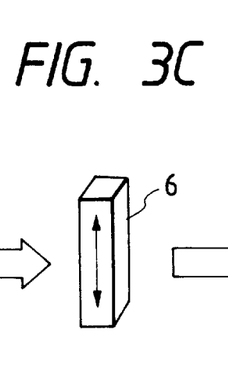
Figure 3D:
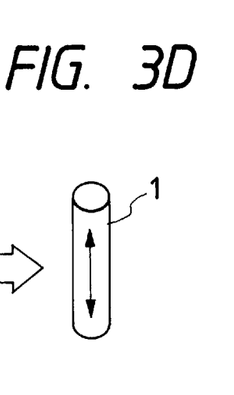

In the present invention, a soft slab foam block 4 shown in FIG. 3A is longitudinal-processed in the foaming direction indicated by an arrow to obtain a planar member 5 which has a predetermined thickness and extends in the foaming direction, as shown in FIG. 3B. Furthermore, the widthwise direction of the planar member 5 is longitudinal-processed in the foaming direction to obtain a prism member 6 which has predetermined dimensions and extends in the foaming direction, as shown in FIG. 3C. Thereafter, the prism member 6 is subjected to a cylindrical process by means of a polishing process or a cutting process using a heated metal wire, and is hollowed out as needed, thus obtaining a roller 1, as shown in FIG. 3D.

Since the polyurethane foamed roller 1 thus manufactured has its roller axis direction which accords with the foaming direction of the slab foam block 4, the cells each having a prolate spheroid shape extending in the roller axis direction are uniformly formed in the sectional direction of the roller. Therefore, the roller 1 has an even internal structure, hardness, and modulas of elasticity, and the structure of the roller surface is also even in the circumferential direction, as shown in FIGS. 1A and 1B.

More specifically, in the roller 1 of the present invention, at a given position in the circumferential direction in FIG. 1A and at a position (FIG. 1B) separated by 90° from the position shown in FIG. 1A, the cells 2 open to the roller surface are each formed into an elliptic shape and are uniformly aligned along the roller axis direction even at the position separated by 90° in the circumferential direction, although the cells 2 have different sizes. Therefore, the surface of the roller 1 has even physical properties such as hardness, and also has even paint holding ability and the like.

An example of the present invention will be described below.

A polyester-based polyurethane soft slab foam (hardness=22 kgf, the number of cells=13 cells per inch) block, which was manufactured by the ordinary method, was longitudinal-processed to obtain a planar member which had a thickness of 6 cm and extended along the foaming direction, and the obtained planar member was longitudinal-processed again to obtain a prism member with a 6 cm×6 cm section. The two end portions of the prism member were cut to adjust the length of the prism member to 25 cm, and the prism member was then polished to obtain a roller having a diameter of 5 cm and a length of 25 cm.

When the obtained roller was used as a paint roller for wall painting, a paint could be evenly pained on a surface to be painted, and good roller performance was confirmed.

An embodiment in which the foamed rotary member of the present invention is used as a toner supplying rotary member, and a developing device using the toner supplying rotary member will be described below.

Figure 7:
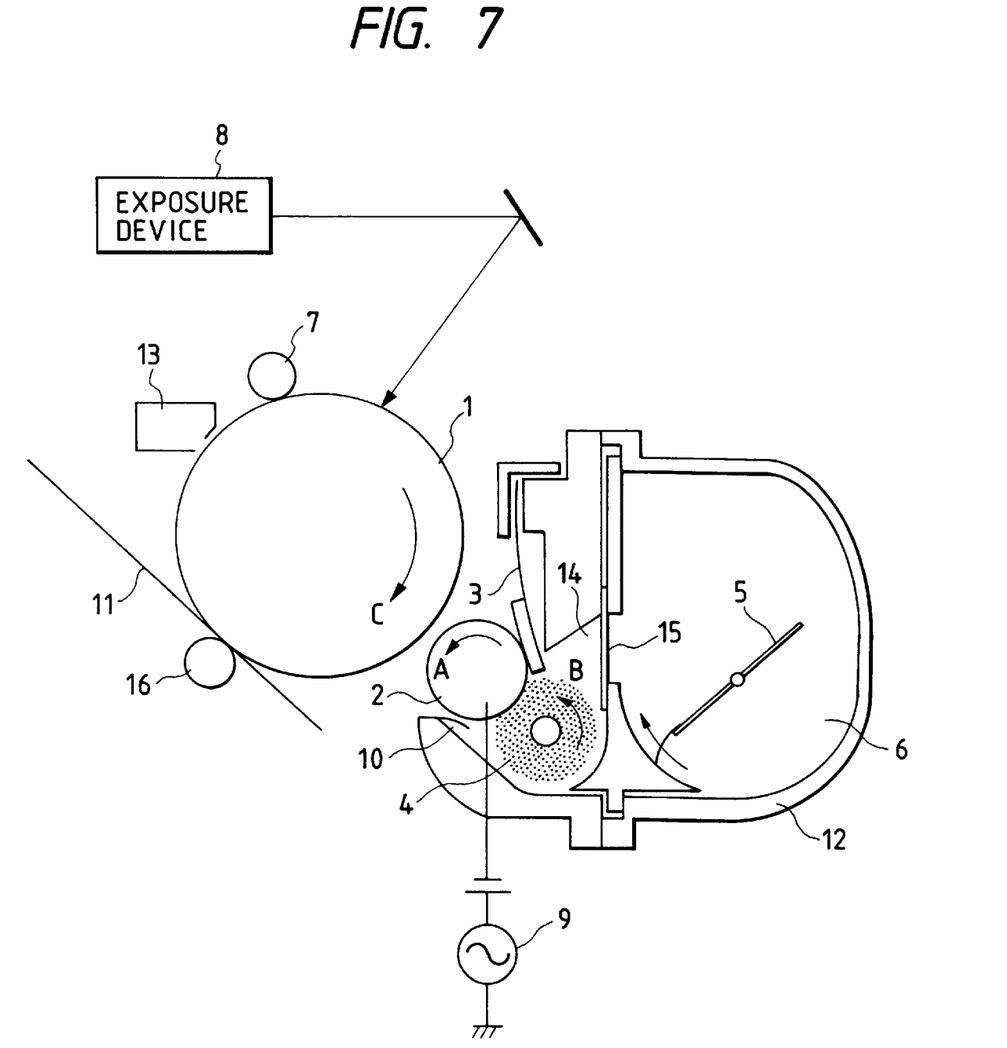
FIG. 7 is a sectional view showing an image forming apparatus which comprises a developing device according to an embodiment of the present invention.

FIG. 7 is a sectional view showing the arrangement of an image forming apparatus, which comprises a developing device using nonmagnetic toner as a monocomponent developing agent.

An image formation process will be explained below. First, the surface of a photosensitive drum 1 as an electrostatic latent image carrier is uniformly charged by a primary charger 7 to have a potential VD=−700 V. Then, image exposure is performed by an exposure device 8 using a laser beam source as a light source, on the basis of image information. As a result, the exposed portion of the surface of the photosensitive drum 1 has a potential VL=−50 V to form an electrostatic latent image on the surface of the drum 1. The latent image is inversion-developed by a developing device 12 using nonmagnetic toner, i.e., is visualized as a toner image. The toner image formed on the surface of the photosensitive drum 1 is transferred onto a transfer sheet 11 fed to the photosensitive drum 1 by a transfer roller 16. The toner image which has been transferred onto the transfer sheet 11 is fixed by a fixing device (not shown) to obtain a permanent image. The residual toner on the photosensitive drum 1 is cleaned by a cleaner 13.

The developing device 12 is provided with a toner chamber 6 and a developing chamber 14, between which a partition 15, which is removed when the developing device 12 is used for the first time, is arranged. The toner chamber 6 stores negative nonmagnetic toner as a monocomponent developing agent, and a convey member 5 for conveying the toner to the developing chamber 14 is arranged in the toner chamber 6. In the developing chamber 14, a conductive developing sleeve 2 is arranged at the opening portion facing the photosensitive drum, and a toner supplying roller 4 is arranged at a position near the toner chamber.

The toner supplying roller 4 contacts the developing sleeve 2 and rotates so as to have a relative speed to the roller 4, to apply the toner conveyed by the convey member 5 onto the developing sleeve 2. The outer diameter of the toner supplying roller 4 is 16 mm, and the diameter of its core metal is 6 mm.

The toner applied onto the developing sleeve 2 is conveyed toward a developing area facing the photosensitive drum 1 upon rotation of the developing sleeve 2, and is regulated to have a predetermined layer thickness by an elastic blade 3, which contacts the developing sleeve 2, during the convey process. The elastic blade 3 is constituted by, e.g., an urethane rubber member alone having elasticity, or by adhering a sheet member of, e.g., urethane rubber to an elastic metal member of, e.g., phosphor bronze. The toner conveyed to the developing area is subjected to development under a developing bias applied from a power supply 9 connected to the developing sleeve 2.

The diameter of the developing sleeve 2 is 20 mm, and the rotational speed of the developing sleeve 2 is set to be 180 rpm so that the developing sleeve 2 rotates at a peripheral velocity about 190% of that of the photosensitive drum 1 corresponding to the process speed of the image forming apparatus, in order to achieve a sufficient image density. The image forming apparatus has a process speed of 100 mm per second, and can output 12 A4-size paper sheets per minute.

In this embodiment, since the respective portions on the outer circumferential surface of the toner supplying roller 4 of the developing device 12 have substantially the same number of cells, an image defect such as pitch unevenness can be eliminated.

Figure 8:
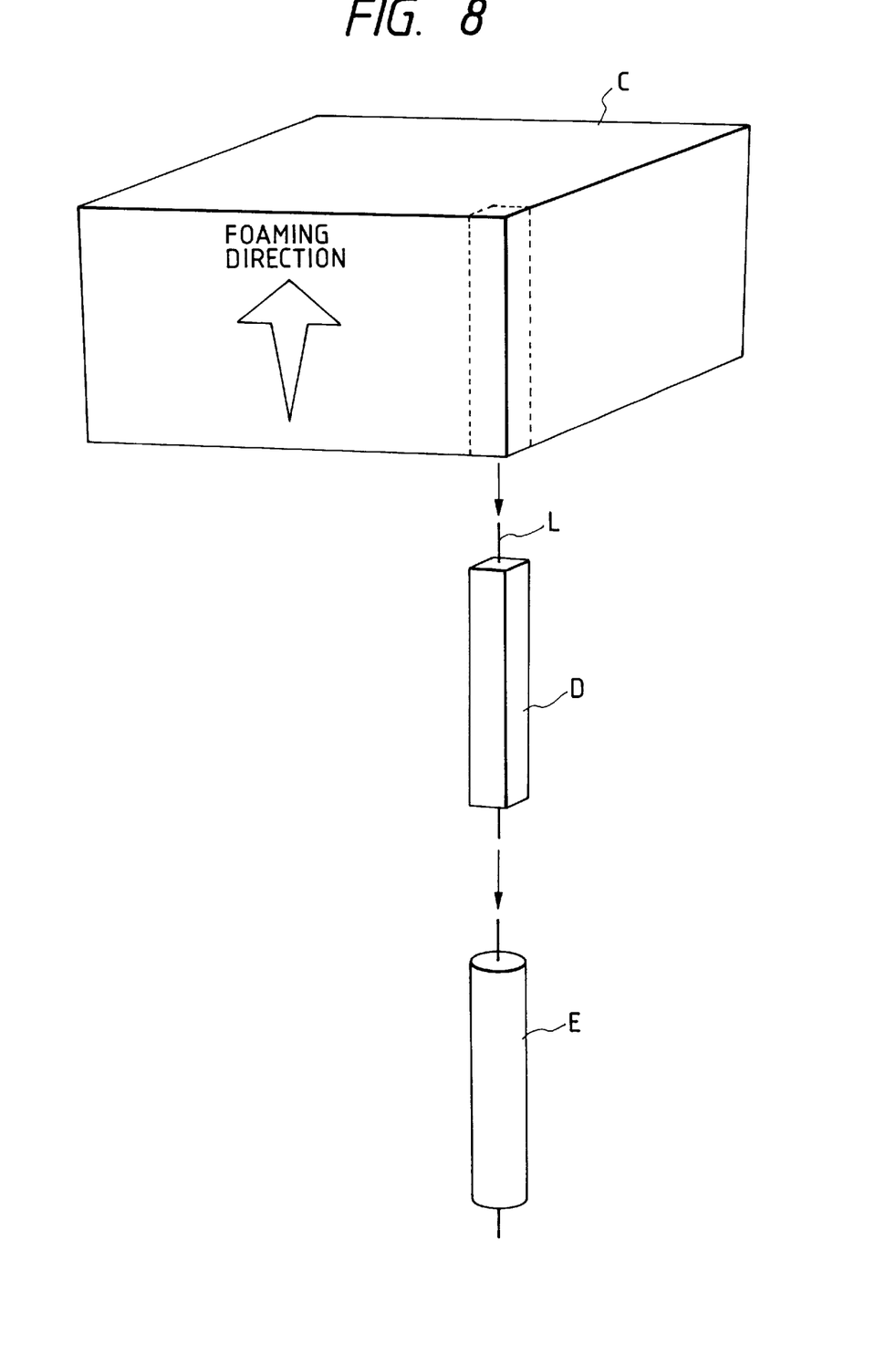
FIG. 8 is an explanatory view showing the method of manufacturing, from a foamed raw fabric, a toner supplying roller in the developing device shown in FIG. 7.

For this purpose, the toner supplying roller 4 is formed, so that its axial direction is parallel to the foaming direction of a foamed urethane raw foam C, as shown in FIG. 8. More specifically, the raw fabric C is cut and divided in the foaming direction, and a shaft L is inserted into a divided foamed urethane D.

The surface of the foamed urethane D with the shaft L inserted is processed to finish a roller E, i.e., the toner supplying roller 4.

As described above, when the longitudinal direction of the toner supplying roller 4 is set to be parallel to the foaming direction of the foamed urethane, since cells on the entire outer circumferential surface of the roller have grown in the same direction, the cells can have the same shape. Therefore, the toner supplying ability and peeling ability can become uniform, and the entire region, in the circumferential direction, of the toner supplying roller 4 can contact the developing sleeve at an equal pressure, thereby eliminating an image defect such as pitch unevenness.

Figure 9:
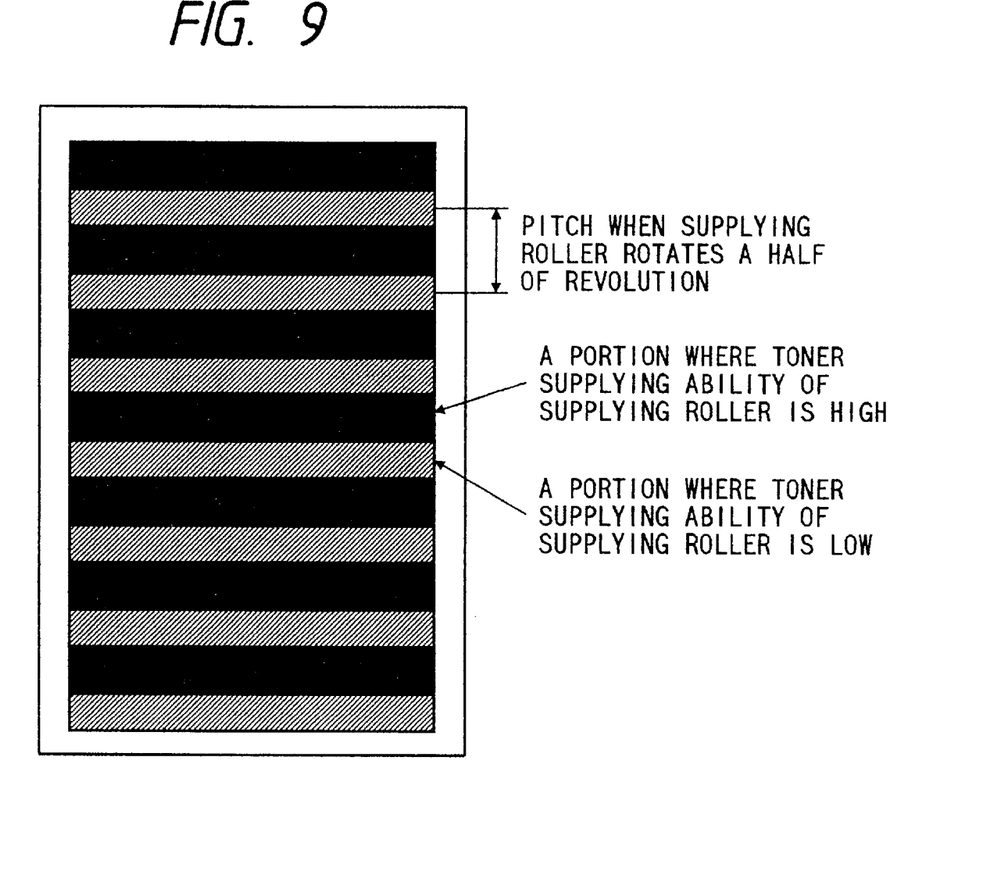
FIG. 9 is a view showing the pitch unevenness of an image.

FIG. 9 shows an image suffering pitch unevenness. The pitch unevenness occurs when a conventional toner supplying roller, which is formed by cutting a foamed raw foam C in the direction perpendicular to the foaming direction, is used, as shown in FIG. 6 above. This toner supplying roller has a maximum value a=80 and a minimum value b=60 for the number of cells per 25 mm, in the roller axis direction, of the outer circumferential surface, and has a value (to be referred to as a cell number ratio hereinafter)=0.25 expressed by the following formula:

$$(a-b)/a$$

In contrast to this, when the maximum value a is 70 and the minimum value b is 63 for the number of cells to obtain a cell number ratio of 0.1, pitch unevenness can be suppressed to a negligible level from the first printed image. Furthermore, when the maximum value a is 70 and the minimum value b is 66 for the number of cells to obtain a cell number ratio of 0.057, no pitch unevenness is observed at all from the first printed image.

Therefore, in this example, the longitudinal direction of the toner supplying roller 4 is set to be parallel to the foaming direction of the foamed urethane, and at the same time, the cell number ratio on the outer circumferential surface of the toner supplying roller 4 is set to be 0.1 or less, and more preferably, 0.05 or less.

In the above-mentioned example, the number of cells on the outer circumferential surface of the toner supplying roller 4 preferably falls within the range from 20 to 100 cells per 25 mm in the roller axis direction on the outer circumferential surface, and in particular, the range from 50 to 100 cells, in a point that the toner supplying ability can be improved.

In order to reduce a variation in driving torque of the developing device by decreasing the frictional coefficient between the toner supplying roller 4 and the developing sleeve 2, further to compensate for a decrease in density of an initial image due to entrance of toner into cells on the outer circumferential surface of the toner supplying roller 4 at the beginning of development, toner is preferably applied onto the surface of the toner supply roller before use of the developing device.

By foaming materials while the height of the raw foam C is set to be equal to the length of the toner supplying roller 4 in advance, the toner supplying roller can be manufactured without increasing cost.

According to the present invention, when the toner supplying roller 4 with the above arrangement is used, the toner peeling ability, the toner supplying ability, and the contact force can become uniform on the entire outer circumferential surface of the toner supplying roller 4, and an even image free from any density unevenness and pitch unevenness can be obtained from the first print.

The embodiments of the present invention has been described. However, the present invention is not limited to these embodiments, and various changes and modifications may be made within the spirit and scope of the invention.

What is claimed is:

1. A foamed rotary member comprising:
   a cylindrical foam member which has a plurality of spheroid-shaped cells extending longer in a foaming direction than in an orthogonal direction,
   wherein an axis direction of said cylindrical foam member is along the foaming direction,
   said cylindrical foam member being formed by longitudinally cutting a foam block in the foaming direction to obtain a foam prism member, and cylindrically processing the foam prism member.

2. A foamed rotary member according to claim 1, wherein said cylindrical foam member comprises polyurethane.

3. A foamed rotary member according to claim 1, wherein at least one of the plurality of cells is a closed cell.

4. A foamed rotary member according to claim 1, wherein said foamed rotary member is a toner supplying rotary member for supplying toner.

5. A foamed rotary member according to claim 1, wherein said foamed rotary member satisfies $(a-b)/a \leq 0.1$ where a is the maximum value of the number of the plurality of cells per 25 mm in the axis direction on an outer circumferential surface of said foamed rotary member, and b is the minimum value of the number of the plurality of cells.

6. A foamed rotary member according to claim 5, wherein said foamed rotary member satisfies $(a-b)/a \leq 0.05$.

7. A developing device comprising:
   a toner carrier which opposes an electrostatic latent image carrier to form a developing portion; and
   a toner supplying rotary member which contacts said toner carrier, peels toner on said toner carrier, and supplies toner to said toner carrier,
   wherein said toner supplying rotary member includes a cylindrical foam member which has a plurality of spheroid-shaped cells extending longer in a foaming direction than in an orthogonal direction, and
   wherein an axis direction of said cylindrical foam member is along with the foaming direction,
   said cylindrical foam member being formed by longitudinally cutting a foam block in the foaming direction to obtain a foam prism member, and cylindrically processing the foam prism member.

8. A device according to claim 7, wherein said toner supplying rotary member is in slide contact with a surface of said toner carrier.

9. A device according to claim 7, wherein the toner is monocomponent nonmagnetic toner.

10. A device according to claim 7, further comprising a regulation member for triboelectrifying toner on said toner carrier to which the toner is supplied from said toner supplying rotary member, and regulating a thickness of a toner layer on said toner carrier.

11. A device according to claim 7, wherein said cylindrical foam member comprises polyurethane.

12. A device according to claim 7, wherein at least one of the plurality of cells is a closed cell.

13. A device according to claim 7, wherein said toner supplying rotary member satisfies $(a-b)/a \leq 0.1$ where a is the maximum value of the number of the plurality of cells per 25 mm in the axis direction on an outer circumferential surface of said toner supplying rotary member, and b is the minimum value of the number of the plurality of cells.

14. A device according to claim 13, wherein said toner supplying rotary member satisfies $(a-b)/a < 0.05$.

* * * * *

UNITED STATES PATENT AND TRADEMARK OFFICE
CERTIFICATE OF CORRECTION

PATENT NO. : 5,930,570

DATED : July 27, 1999

INVENTOR(S) : YOSHIRO SAITO, ET AL.

It is certified that error appears in the above-identified patent and that said Letters Patent is hereby corrected as shown below:

On the title page: Item

[56] FOREIGN PATENT DOCUMENTS:
    "05061350" should read --5-61350--.
    "05119618" should read --5-119618--.

COLUMN 5:
    Line 51, "stylene," should read --styrene,--.

COLUMN 7:
    Line 8, "pained" should read --painted--.

COLUMN 8:
    Line 18, Close up left margin.

COLUMN 9:
    Line 18, "has" should read --have--.

UNITED STATES PATENT AND TRADEMARK OFFICE
CERTIFICATE OF CORRECTION

PATENT NO. : 5,930,570

DATED : July 27, 1999

INVENTOR(S) : YOSHIRO SAITO, ET AL.

It is certified that error appears in the above-identified patent and that said Letters Patent is hereby corrected as shown below:

<u>COLUMN 10</u>:
    Line 16, "with" should be deleted.
    Line 41, "(a-b)/a<0.05." should read --(a-b)/a$\leq$0.05.--.

Signed and Sealed this

Twentieth Day of June, 2000

Attest:

Q. TODD DICKINSON

*Attesting Officer*     *Director of Patents and Trademarks*